United States Patent [19]

Broecker et al.

[11] 3,937,677

[45] Feb. 10, 1976

[54] PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

[75] Inventors: Bernhard Broecker, Hamburg; Richard Schardt, Oststeinbeck; Gerhard Werner, Glashutten, all of Germany

[73] Assignee: Hoechst Aktiengesellschaft, Germany

[22] Filed: Mar. 11, 1974

[21] Appl. No.: 449,618

[30] Foreign Application Priority Data

Mar. 13, 1973 Switzerland.......................... 3619/73

[52] U.S. Cl............. 260/23.7 A; 106/243; 106/244; 106/247; 106/257 R; 204/181; 260/29.7 R
[51] Int. Cl.$^2$......................................... B25B 13/28
[58] Field of Search..... 260/23.7 A, 23.7 R, 29.7 R, 260/29.7 AT, 29.7 H, 41.5 A, 41.5 R, 78.4 D; 106/243, 244, 247, 287 R; 204/181

[56] References Cited

UNITED STATES PATENTS

| | | | |
|---|---|---|---|
| 2,905,649 | 9/1959 | Craig | 260/23.7 A |
| 3,422,044 | 1/1969 | Erikson | 260/23.7 A |
| 3,518,213 | 6/1970 | Miyoshi | 260/22 |
| 3,681,276 | 8/1972 | Nogahisa | 260/23.7 R |
| 3,689,446 | 9/1972 | Furuya | 260/23.7 R |
| 3,705,866 | 12/1972 | Shibata | 260/23.7 A |
| 3,789,046 | 1/1974 | Heidel | 260/23.7 A |

FOREIGN PATENTS OR APPLICATIONS 1,154,174   6/1969   United Kingdom

Primary Examiner—Melvyn I. Marquis
Attorney, Agent, or Firm—Gordon W. Hueschen

[57] ABSTRACT

The present invention relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electropheretic coating process.

20 Claims, No Drawings

PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

BACKGROUND OF THE INVENTION

German Published Pat. Specification No. 2,016,223 describes the manufacture of polymeric products which can be diluted with water and which consist of 10 – 70 % by weight of an unsaturated fatty acid ester, 85 – 10 % by weight of polybutadiene and 5 – 20 % by weight of maleic anhydride. On page 4, last paragraph, of this German Published Patent Specification it is stated that the manufacturing process is carried out by first reacting the unsaturated fatty acid ester and the polybutadiene with one another at 180°– 270°C. and then forming the adduct of maleic anhydride. The binders thus obtained are stated to give electrophoretically deposited films which after stoving have improved corrosion protection, better permanent elasticity and good hardness. The bath solutions are stated to have excellent storage stability and the binder is supposed to be capable of trouble-free deposition even at high potentials. However, the binders obtained according to German Published Patent Specification 2,016,223 suffer from a series of disadvantages. Thus, the electrophoresis baths prepared with these binders display only inadequate values of the throwing power, and on stoving, especially in the case of fairly thick layers (above 24 $\mu$), the films show insufficient hardening in depth and the electrophoretically deposited films show marks from drops of water after having been sprayed down with water and then stoved.

These disadvantages are overcome by the synthetic resins manufactured according to the process of the invention. The synthetic resins obtained according to this process display good to excellent values of the throwing power when used as binders in electrophoretic coating baths. The electrophoretically deposited films cure well in depth, on stoving at about 180°C for 30 minutes, even in the case of thick layers (23° – 28 $\mu$). The electrophoretically deposited films can be sprayed down with water and the films show no marks from drops of water after stoving.

British Pat. Specification No. 1,102,652 describes the manufacture of water-soluble binders suitable for the electrophoretic coating process, polybutadiene being reacted with maleic anhydride. These electrophoresis baths prepared with such binders, however, display inadequate values of the throwing power. The films show inadequate hardness after stoving.

British Patent Specification No. 1,154,174 describes the manufacture of binders which can be diluted with water and are suitable for the electrophoretic coating process, and which consist of 40 – 80 % by weight of polybutadiene, 15 – 55 % by weight of unsaturated fatty acid and 5– 15 % by weight of fumaric acid. Page 2, lines 38 – 43 of this Patent Specification mentions that hydrocarbon resins based on cyclopentadiene or piperylene can also be added. These binders also show poor values of the throwing power in electrophoresis baths. After spraying down with water and stoving, the films obtained show marks from drops of water and more inadequately hardened in depth.

SUMMARY

The present invention relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterised in that a mixture consisting of:

a. 20 – 60 % by weight of a polybutadiene having an average molecular weight of 750 – 2,000 and an iodine number between 300 and 450, b. 10 – 60 % by weight of a hydrocarbon resin of predominantly aliphatic structure, having a viscosity between 30 and 800 cP (measured in 70 % strength solution in toluene at 20°C.) and an iodine number of between 160 and 400, consisting of $b_1$. 20 – 80 % by weight of polyisoprene, $b_2$. 5 – 35 % by weight of cyclopentadiene and/or dicyclopentadiene, and $b_3$. 5 – 50 % by weight of further mono-unsaturated or poly-unsaturated hydrocarbons with 5 – 6 C atoms which are of predominantly aliphatic or cycloaliphatic structure, and c. 5 – 40 % by weight of a fatty acid glyceride ester, wherein each fatty acid radical contains 16 – 18 C atoms and the fatty acid glyceride ester has an iodine number between 140 and 220, is pre-polymerised by heating to 200° – 270°C. until the reaction mixture of components (a), (b) and (c), which has an initial viscosity of about 100 – 300 sec (measured according to DIN 53,211), displays viscosities between 500 and 2,000 sec (measured according to DIN 53,211), the resulting mixture is then reacted with d. 10 – 20 % by weight of maleic anhydride at 180° – 190°C., until no further free maleic anhydride is present, and e. in the resulting adduct the anhydride groups present are opened by hydrolysis with water or alcoholysis with the amount of monohydric alcohols with 1 – 4 C atoms required to form the half-ester.

In the process of the present invention, it is possible to use, as component (a), polybutadienes in the form of homopolymers of butadiene with an average molecular weight of 750 – 2,000 and iodine numbers between 300 and 450.

By polybutadienes there are to be understood all commercially available isomers, both those with cis- and trans-double bonds in the middle position and those with vinyl double bonds. The following are particularly preferred:

1. a polybutadiene of average molecular weight approx. 1,400 and iodine number 450, wherein 65 – 75 % of the double bonds have the 1,4-cis configuration, 25 – 35 % have the 1,4-trans configuration and less than 1 % have the 1,2-vinyl configuration.

2. A polybutadiene of average molecular weight 1,000 to 1,500 and iodine number 420, wherein 10 % of the double bonds have the 1,4-cis configuration, 45 % have the 1,4-trans configuration and 45 % have the 1,2-vinyl configuration.

3. A polybutadiene of average molecular weight 900 and iodine number 360, wherein 10 % of the double bonds have the 1,4-cis configuration, 45 % have the 1,4-trans configuration and 45 % have the 1,2-vinyl configuration.

Under polybutadienes there are also to be understood butadiene polymers with terminal carboxyl groups or hydroxyl groups, but these do not belong to the preferred embodiment. The manufacture of these butadiene polymers with terminal carboxyl groups or hydroxyl groups is described in "Rubber and Plastics Age," 1964, volume 45, No. 11, page 1,347.

Suitable components (b) are unsaturated hydrocarbon resins of predominantly aliphatic structure which are obtained by polymerisation of unsaturated $C_5$-cuts which arise on distillation of petroleum. These hydrocarbon resins should have iodine numbers between 160 and 400 and viscosities between 30 and 800 cP (measured in 70 % strength solution in toluene at 20°C). The hydrocarbon resins suitable for the process according to the invention should be built up from 20 – 80 % by weight of polyisoprene, 5 – 35 % by weight of cyclopentadiene or dicyclopentadiene and 5 – 50 % by weight of further mono-unsaturated or poly-unsaturated hydrocarbons with 5 and/or 6 C atoms, and should have iodine numbers between 160 and 400.

Hydrocarbon resins which are built up by polymerisation from 40 – 60 % by weight of isoprene, 20 – 35 % by weight of cyclopentadiene and 5 – 40 % by weight of further polymerizable unsaturated hydrocarbons with 5 – 6 C atoms are preferred.

Hydrocarbon resins made by polymerizing 25 – 40 % by weight of isoprene, 15 – 30 % by weight of methyl cyclopentadiene and 5 – 30 % by weight of further polymerizable unsaturated hydrocarbons with 5 – 6 C atoms are particularly preferred.

Suitable unsaturated fatty acid glyceride esters are the triglycerides of unsaturated fatty acids, such as tall oil fatty acid, soya oil fatty acid, linseed oil fatty acid, dehydrated castor fatty acid, wood oil fatty acid, groundnut fatty acid, rape oil fatty acid and the like individually or as mixture, linseed oil, wood oil and dehydrated castor oil being preferred. In the most preferred embodiment linseed oil is used as unsaturated fatty acid glyceride ester.

The polybutadiene (a), the hydrocarbon resin (b) and the fatty acid glyceride ester (c) are first heated to 200°– 270°C under a protective gas. Nitrogen or carbon dioxide are suitable protective gases. Heating is continued until the viscosity, of samples which are withdrawn, has risen from 100 – 300 sec to 430 – 2,000 sec (DIN 53,211). Higher viscosities than those mentioned should be avoided since at higher viscosities the addition of maleic anhydride is frequently no longer possible without danger of gelling, or the films applied electrophoretically using such products do not have adequate levelling.

If the viscosities of the intermediate product are too low, the values of the throwing power of the end product are in general inadequate and the films are vey sensitive to marks from drops of water. The initial viscosities of the mixture of components (a) – (c) are between 100 and 300 sec (Din 53,211). After the desired final viscosity has been reached, the polymerised mixture is reacted with maleic anhydride. This reaction is carried out at 180°– 190°C, it being necessary to take great care that the temperature does not go outside this range.

At lower temperature, the addition does not take place sufficiently rapidly whilst at higher temperatures there is a danger of the batches gelling.

Preferably, polymerization inhibitors, for example hydroquinone, tert.-amyl hydroquinone, diphenyl-amine, diphenylenediamine, copper or copper salts, for example copper naphthenate, are needed to the reaction batch. The reaction is continued until the free maleic anhydride content has fallen to 0 %. In general, 3 – 8 hours are required for this purpose. Thereafter, the anhydride group in the reaction product (adduct) is opened either by treatment with water (hydrolysis) optionally under raised pressure or by treatment with monohydric saturated aliphatic alcohols (alcoholysis) with 1 – 4 C atoms, forming the half-ester.

These two reactions are preferably accelerated by the addition of catalytic amounts of tertiary amines such as triethylamine, tributylamine and the like, and are carried out at 80° – 120°C. In general, a time of 1 – 2 hours or more is required for this purpose.

The viscosities of the end products are between 40 and 152 seconds ((DIN 53,211), measured at 50 % strength by weight in ethylene glycol monobutyl ether) and the acid numbers should be between 60 and 140.

After the opening of the anhydride group, the resulting synthetic resins are diluted with water-soluble solvents and/or solvents of only limited solubility in water. Suitable solvents are, for example, ethanol, propanol, isopropanol, ethylene glycol monomethyl ether, monoethyl ether, monoisopropyl ether and monobutyl ether and also butanol, diethylene glycol, monoethers and di ethers of diethylene glycol, methyl ethyl ketone, diacetone alcohol and dimethylsulphoxide.

Minor proportions of water-insoluble solvents such as xylene, benzine, cyclohexanol, cyclohexanone, nonanol and decanol can be used conjointly. The total proportion of solvents should not exceed 30 parts by weight (relative to 100 parts by weight of binder solution), and the proportion of water-insoluble solvents should be at most 20 parts by weight of the amount of solvent employed.

In order to convert the resulting synthetic resin solution into a state where it can be diluted with water, the solution is neutralised almost completely, or partially. Preferably, ammonia is used for this purpose. Strong organic nitrogen bases of which a 10 % strength by weight aqueous solution has a pH of at least 8, are also suitable. For example, amines such as, for example, dimethylamine and trimethylamine, triethylamine, diethylamine, propylamine, butylamine, diethanolamine, triethanolamine, N-methylethanolamine, N,N-dimethylethanolamine and diisopropanolamine can be used as strong organic nitrogen bases. Alkalis such as sodium hydroxide or potassium hydroxide are also suitable.

All customary pigments, fillers and lacquer auxiliaries can be used for pigmenting the binders. Only the use of basic pigments such as, for example, zinc oxide, requires careful testing in each individual case.

The synthetic resins manufactured according to the invention are particularly suitable for use as binders for the electrophoretic lacquering process, for which the electrophoresis baths should have a total solids content between 7 and 20 % by weight. The synthetic resins manufactured according to the invention are intended to be used as binders for lacquers.

However, these lacquers can also be applied by spraying, dipping or flooding onto the articles to be lacquered. The stoving temperature after application is about 170° – 180°C for 30 minutes.

In a preferred embodiment of the invention, the synthetic resin obtained according to the process of the invention should contain the components used in the following percentages:
a. 20 – 60 % by weight of polybutadiene,
b. 10 – 60 % by weight of hydrocarbon resin,
c. 5 – 40 % by weight of unsaturated oil and
d. 10 – 20 % by weight of maleic anhydride.

In the most preferred embodiment of the invention, the synthetic resin obtained according to the process of invention should contain the components used in the following percentages:
a. 45 – 50 % by weight of polybutadiene,
b. 15 – 60 % by weight of hydrocarbon resin
c. 15 – 20 % by weight of unsaturated oil and
d. 17.5 – 20 % by weight of maleic anhydride.

In another more preferred embodiment of the invention, the proportion of component (a) is between 35 and 60 % by weight, component (b) lies in the range of 20 to 25 %, component (c) is between 15 and 30 % by weight and component (d) about 15 % by weight. The proportions used depend on the desired properties of the binder. Thus, proportions of component (b) >25 % by weight admittedly give binders with very good values of the throwing power, but the mechanical properties of the films produced after stoving are unsatisfactory. Proportions of component (c) >30 % by weight in general cause a deterioration of the corrosion resistance of the films produced by stoving. Proportions of component (d) >20 % by weight leads to binders which in electrophoresis baths display very high conductivities and which frequently can only be deposited electrophoretically with flaws in the film. In the above-mentioned preferred or most preferred embodiments of the invention, respectively, linseed oil is employed as the unsaturated oil.

The process of the invention is best carried out as follows. Components (a.) to (c.) are mixed under inert gas and then pre-polymerized to the desired viscosity by heating to 250° – 270°C. After cooling to 120° – 140°C. the maleic anhydride and the inhibitor are added. After decay of the exothermic reaction the reaction is carried on at 180° – 190°C until the content of free maleic anhydride has fallen to zero. Air has to be kept out of the reaction flask and the reaction should not be interrupted after addition of the maleic anhydride. Thereafter the resin is cooled to 80°C. and the water or alcohol, respectively, is added for cleavage of the anhydride group. The reaction (alcoholysis) with alcohol works without problems in the course of 1 – 2 hours at 80° – 100°C.; the reaction with water (hydrolysis) takes longer time (2 to 3 hours) at 100°C. whereby the use of raised pressure is advantageous. Thereafter the mix is diluted with solvent at 60° – 70°C.

Manufacture of hydrocarbon resin 1 (component b): 1,000 g of toluene and 75 g of $BF_3$-etherate are mixed and cooled to +5°C. whilst stirring. 1,500 g of a $C_5$-cut composed of 11.4 % by weight of pentane, 18.9 % by weight of isoprene, 12 % by weight of 1.3-pentadiene, 25.3 % by weight of cyclopentadiene and dicyclopentadiene and 20 % by weight of further unsaturated constituents with 5 – 6 C atoms in the molecule and 12 % by weight of further saturated constituents with 5 – 6 C atoms in the molecule are then added dropwise, whilst stirring at a speed such that the temperature does not exceed 10°C.

After the end of the addition, the temperature in the reaction mixture is allowed to rise to 15° – 20°C and the reaction is allowed to continue for a further 3 hours whilst continuing to stir. 150 g of $Ca(OH)_2$ + 10 g of $H_2O$ are added whilst cooling. The batch is then filtered and concentrated to remove the toluene and the unreacted monomers. 400 g of an unsaturated hydrocarbon resin of viscosity 120 cP (measured at 70 % strength in toluene at 20°C) and an iodine number of 220 are left.

EXAMPLE 1

500 g of a polybutadiene of iodine number 450 and average molecular weight approx. 1,400, whereby the double bonds have 65 – 75 % of 1,4-cis configuration, 25 – 35 % of 1,4-trans configuration and below 1 % of 1,2-vinyl configuration, are mixed with 200 g of the unsaturated hydrocarbon resin 1 and 125 g of linseed oil. The viscosity of the mixture is 150 sec. The batch is heated to 250°C under inert gas until the viscosity according to 4 DIN 53,211 is 630 sec. 175 g of maleic anhydride are then added all at once at 160°C. and the temperature is kept at between 180° and 190°C. until the content of free maleic anhydride is practically zero. 60 g of methanol and 0.5 g of triethylamine are then added at 80°C. and the temperature is raised to 100°C. for 1 hour. This has opened the anhydride groups in the adduct. The synthetic resin is then diluted with ethylene glycol monoethyl ether to a solids content of 75 % by weight.

The synthetic resin is neutralized, applied electrophoretically in layer thickness of 25 $\mu$ and stoved (30 mins at 180°C.) to give a lacquer film having very good corrosion resistance in the salt spray test, and good elasticity. The electrophoresis bath possesses good throwing power.

EXAMPLE 2

300 g of the polybutadiene described in Example 1 and 350 g of the hydrocarbon resin 1 described in Example 1 are mixed with 150 g of linseed oil; the viscosity of the batch being 220 sec. The batch is heated to 250°C. under inert gas ($CO_2$) until the viscosity according to DIN 53,211 is 670 sec. It is then cooled to 160°C. Thereafter, 200 g of maleic anhydride are added at 160°C. and the reaction is carried out at 180° – 190°C. until the content of free maleic anhydride has fallen practically to zero (in about 4 hours). 38 g of water and 0.5 g of triethylamine are then added to the resin at 100°C and the mixture is heated for 2 hours at 100°C. until all the anhydride groups have been opened. It is then diluted with ethylene glycol monomethyl ether to a solids content of 75 % by weight.

The synthetic resin is neutralized, applied electrophoretically as a clear lacquer onto steel sheets and stoved (30 mins at 170°C.) to give a hard film which proves corrosion-resistant in the salt spray test (ASTM B 117–64). The electrophoresis bath prepared from the resin shows excellent values of the throwing power. Further examples can be seen in the table which follows.

Manufacture of the hydrocarbon resin 2 (component b):

400 g of toluene are cooled to +5°C. whilst stirring. 2,000 g of a $C_5$-cut composed of 15.4 % by weight of n-pentane, 5.3 % by weight of cyclopentane, 13 % by weight of n-pentane and isopentane, 4.2 % by weight of cyclopentene, 15.9 % by weight of 1,3-pentadiene, 18.6 % by weight of isoprene, 14.5 % by weight of cyclopentadiene + dicyclopentadiene and 10.6 % by weight of other monomers with 6 C atoms, and a solution of 50 g of $BF_3$-etherate in 400 g of toluene, are then added dropwise in such a way that the temperature does not rise above 10°C. The reaction is then allowed to continue for a further 2 hours at 5° – 10°C., thereafter the temperature is allowed to rise to 15°C., and the reaction is allowed to continue for a further 3 hours at this temperature. 187 g of sodium bicarbonate and 2 ml of water are now added. The mixture is then filtered and concentrated. 1,000 g of an unsaturated hydrocarbon resin having a viscosity of 80 – 100 cP (measured at 70 % strength by weight in toluene at 20°C.) and an iodine number of 250 – 290 remain.

Hydrocarbon resin 3:

This is a commercially available hydrocarbon resin from 36 % by weight of cyclopentadiene, 15 % by weight of methylcyclopentadiene and 30 % by weight of isoprene (Escopol, of Messrs. Esso), with an average molecular weight of 600 and an iodine number of 190.

Comparison tests to prove the technical advance achieved:

Comparison experiment A

According to the data given in German Published Pat. Specification 2,016,233, 400 parts of a polybutadiene of iodine number 450 and average molecular weight approx. 1,400 with double bonds of 65 – 75 % of 1,4-cis configuration, 25 – 35 % of trans configuration and below 1 % of 1,2-vinyl configuration and 183 parts of soya oil were heated to 260°C. until the viscosity (measured at 70 % strength by weight in xylene) had risen to 25 seconds according to DIN 53,211 (corresponding to 1,600 seconds measured directly according to DIN 53,211). 10 g of copper naphthenate solution (Cu content 8 % by weight) were added, followed by 75 g of maleic anhydride. After 40 minutes at 190°C. the batch gelled.

Comparison experiment B

The procedure followed was as in comparison experiment A, but the soya oil was replaced by an equal amount of linseed oil. After 30 minutes at 190°C., the batch gelled.

Comparison experiment C

The procedure followed was as in comparison experiment B but a polybutadiene having an average molecular weight of 1,000 – 1,5000 and an iodine number of 357, and containing 45 % by weight of vinyl groups, 45 % by weight of trans structures and 10 % by weight of cis structures was used. After a reaction time of 4 hours at 190°C. the content of non-bonded maleic anhydride has fallen to zero. The anhydride groups were opened by treatment with water and keeping the mixture at 100°C. The resulting synthetic resin was diluted to a solids content of 75 % by weight with ethylene glycol monethyl ether. The synthetic resin was pigmented with a mixture of equal parts of titanium dioxide and aluminum silicate and a little carbon black, using a pigment/binder ratio of 0.3 : 1, and after neutralization with ammonia the whole was diluted to a solids content of 13 % by weight. This electrophoresis bath is compared with a bath prepared in the same manner, to which the synthetic resin described in Example 1 was added as the binder.

|  | Binder according to comparison experiment C | Binder according to Example 1 |
| --- | --- | --- |
| Curing in depth at 20 μ layer thickness | good | good |
| Curing in depth at 25 μ layer thickness on pickled steel | inadequate | good |
| Marks from drops of water | strong | slight |
| Throwing power* | 20/20/14/10 | 20/8/2/0 |

*A 50 cm long and 5 cm wide steel strip is introduced into a plastic tube of 6 cm diameter which carries a disc-shaped copper cathode at the bottom, in such a way that the distance of the strip from the cathode is 2 cm.

The deposition is carried out at such a voltage that on the steel strip a layer of 20 μ thickness was reached 2 cm from the lower edge. The layer thickness at 15, 30 and 45 cm distance is measured.

The invention also relates to the use of the synthetic resins, which can be diluted with water, manufactured to the present process, for the manufacture of unpigmented, pigmented and/or filled heatcurable coating agents, the resins being used as the sole binder or mixed with other binders.

In a special use of the synthetic resins manufactured according to the invention, relatively low molecular, at least hydrophilic, heat-curable condensation products, such as reaction products which form aminoplasts, and /or phenol-resols and/or esterified phenolresols, are co-used as further binders for coating agents which can be stoved.

Thses and other binders are explained in detail in Swiss Patent Specification 523,929, column 8, line 47 to column 10, line 19.

In a further special application, such synthetic resins are used for the electrophoretic coating process, phenoplasts and/or aminoplasts being co-used as other binders, these having been combined with the synthetic resins obtained according to the process of the present invention, prior to neutralization, by warming at temperatures of 100°– 150°C. so that pre-condensation takes place.

With regard to how to carry out the pre-condensation, reference should be made to the comments in Swiss Pat. Specification No. 523,929, column 10, line 20 to line 57.

| Example | Polybuta-diene % by weight (as in Example 2) | Hydrocarbon resin % by weight | Linseed oil % by weight | Wood oil % by weight | Pre-polymerized to a viscosity of ... sec according to DIN 53,211 | maleic anhydride % by weight | Anhydride group opened with |
|---|---|---|---|---|---|---|---|
| 3 | 50 | 20 hydrocarbon 2 | 12.5 | — | 1,150 | 17.5 | methanol |
| 4 | 50 | 20 hydrocarbon 2 | 12.5 | — | 890 | 17.5 | $H_2O$ |
| 5 | 40 | 30 hydrocarbon 2 | 15 | — | 1,560 | 15 | methanol |
| 6 | 45 | 17.5 hydrocarbon 3 | 20 | — | 1,500 | 17.5 | methanol |
| 7 | 40 | 25 hydrocarbon 3 | 17.5 | — | 1,00 | 17.5 | methanol |
| 8 | 25 | 25 hydrocarbon 3 | 30 | — | 490 | 20 | $CH_3OH$ |
| 9 | 25 | 25 hydrocarbon 3 | 30 | — | 892 | 20 | $CH_3OH$ |
| 10 | 25 | 18 hydrocarbon 3 | 37 | — | 890 | 20 | $CH_3OH$ |
| 11 | 30 | 25 hydrocarbon 3 | 15 | 10 | 890 | 20 | $CH_3OH$ |
| 12 | 30 | 25 hydrocarbon 3 | 15 | 10 | 490 | 20 | $CH_3OH$ |
| 13 | 40 | 25 hydrocarbon 3 | 5 | 10 | 890 | 20 | $CH_3OH$ |
| 14 | 40 | 25 hydrocarbon 3 | 15 | — | 890 | 20 | $CH_3OH$ |
| 15 | 40 | 25 hydrocarbon 3 | 20 | — | 730 | 15 | $CH_3OH$ |
| 16 | 40 | 25 hydrocarbon 3 | 5 | 10 | 895 | 20 | n-propanol |
| 17 | 40 | 25 hydrocarbon 3 | 5 | 10 | 895 | 20 | n-butanol |
| 18 | 45 | 10 hydrocarbon 3 | 15 | 10 | 890 | 20 | $CH_3OH$ |
| 19 | 45 | 12 hydrocarbon 3 | 23 | — | — | 20 | $CH_3OH$ |
| 20 | 50 | 10 hydrocarbon 3 | 22 | — | — | 18 | $CH_3OH$ |
| 21 | 40 | 15 hydrocarbon 3 | 25 | — | — | 20 | $CH_3OH$ |
| 22 | 45 | 30 hydrocarbon 3 | 7.5 | — | — | 17.5 | $CH_3OH$ |
| 23 | 30 | 45 hydrocarbon 3 | 15 | — | — | 20 | $CH_3OH$ |

| Example | Polybutadiene | Hydrocarbon resin | Linseed oil | oil % by weight | Pre-polymerized viscosity | maleic anhydride | Anhydride opened with |
|---|---|---|---|---|---|---|---|
| 24 | 45 | 10 hydrocarbon 3 | 15 | soya oil | 1,000 | 20 | $CH_3OH$ |
| 25 | 45 | 10 hydrocarbon 3 | 15 | colza oil | 1,050 | 20 | $CH_3OH$ |
| 26 | 45 | 10 hydrocarbon 3 | 15 | tall oil fatty acid triglyceride ester | 980 | 20 | $CH_3OH$ |
| 27 | 45 | 10 hydrocarbon 3 | 15 | peanut oil fatty acid triglyceride ester | 900 | 20 | $CH_3OH$ |
| 28 | 45 | 10 hydrocarbon 3 | 7.5 / 7.5 | soya oil / linseed oil | 1,000 | 20 | $CH_3OH$ |
| 29 | 45 iodine number 420 10 % 1,4-cis 45 % 1,4-trans 45 % 1,2-vinyl molecular weight 1,000 – 1,500 | 17.5 hydrocarbon 3 | 20 | soya oil | 1,550 | 17.5 | $CH_3OH$ |
| 30 | 45 iodine number 360 10 % 1,4-cis 45 % 1,4-trans 45 % 1,2-vinyl molecular weight 900 | 17.5 hydrocarbon 3 | 20 | soya oil | 1,550 | 17.5 | $CH_3OH$ |
| 31 | instructions followed as in Example 6 | | | | | | ethanol |
| 32 | ″ | | | | | | n-butanol |
| 33 | ″ | | | | | | sec.butanol |
| 34 | ″ | | | | | | isobutanol |

The above Examples 3 – 30 were made according to instructions given in Example 1, however, by using the raw materials and the amounts as mentioned in the Table above.

What is claimed is:

1. Process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterized in that a mixture consisting of a. 20–60% by weight of a polybutadiene having an average molecular weight of 750–2,000 and an iodine number between 300 and 450, b. 10–60% by weight of a hydrocarbon resin of predominantly aliphatic structure, having a viscosity between 30 and 800 cP, measured in 70% strength solution in toluene at 20°C. and an iodine number of between 160 and 400, consisting of $b_1$. 20–80% by weight of polyisoprene, $b_2$. 5–50% by weight of cyclopentadiene and/or dicyclopentadiene, and $b_3$. 5–50% by weight of further mono-unsaturated or poly-unsaturated hydrocarbons with 5–6 C atoms which are of predominantly aliphatic or cycloaliphatic structure, and c. 5–40% by weight of a fatty acid glyceride ester, wherein each fatty acid radical contains 16–18 C atoms and the fatty acid glyceride ester has an iodine number between 140 and 220, is pre-polymerized by heating to 200°–270°C. until the reaction mixture of components (a), (b) and (c), which has an initial viscosity of about 100 to 300 sec., measured according to DIN 53,211, displays viscosities between 500 and 2,000 sec., measured according to DIN 53,211, the resulting mixture is then reacted with d. 10–20% by weight of maleic anhydride at 180° to 190°C., until no further free maleic anhydride is present, the sum of components (a), (b), (c) and (d) employed having to add up to 100 % by weight, and e. in the resulting adduct the anhydride groups present are opened by hydrolysis with water or alcoholysis with the amount of monohydric alcohols with 1–4 C atoms required to form the half-ester.

2. Process according to claim 1, characterised in that polybutadienes in the form of homopolymers of butadiene with an average molecular weight of 750 – 2,000 and iodine numbers of between 300 and 450 are employed as component (a).

3. Process according to claim 2, characterised in that a polybutadiene with an average molecular weight of about 1,400 and an iodine number of 450, 65 – 75 % of the double bonds being in the 1,4-cis configuration, 25 – 35 % in the 1,4-trans configuration and less than 1 % in the 1,2-vinyl configuration, is employed as component (a).

4. Process according to claim 2, characterised in that a polybutadiene with an average molecular weight of 1,000 – 1,500, and an iodine number of 420, 10 % of the double bonds being in the 1,4-cis configuration, 45 % in the 1,4-trans configuration and 45 % in the 1,2 vinyl configuration, is employed as component (a).

5. Process according to claim 2, characterised in that butadiene polymers with terminal carboxyl groups or hydroxyl groups are employed as component (a).

6. Process according to claim 1, characterised in that hydrocarbon resins which are built up by polymerisation from 40 – 60 % by weight of isoprene, 20 – 35 % by weight of cyclopentadiene and 5 – '% by weight of further unsaturated hydrocarbons with 5 – 6 C atoms are employed as component (b).

7. Process according to Claim 1, characterised in that triglycerides of unsaturated fatty acids, such as tall oil fatty acid, soya oil fatty acid, linseed oil fatty acid, dehydrated castor fatty acid, wood oil fatty acid, groundnut fatty acid, rape oil fatty acid and the like, and particularly preferentially linseed oil, wood oil and/or dehydrated castor oil individually or in mixture, are employed as component (c).

8. Process according to claim 1, characterised in that the hydrolysis or alcoholysis is carried out at 80° – 120°C and is accelerated by addition of catalytic amounts of teriary amines.

9. Process according to claim 1, characterized in that end products with viscosities of between 40 and 152 seconds, as measured according to DIN 53,211, measured at 50% strength by weight in ethylene glycol monobutyl ether, and acid numbers of between 60 and 140 are manufactured through choice of the reactants and of the reaction time.

10. Process according to Patent claim 1, characterized in that after the opening of the anhydride group by hydrolysis or alcoholysis the resulting synthetic resins are diluted with solvents which are water-soluble and/or only have limited solubility in water.

11. Process according to claim 10, characterized in that minor proportions of water-insoluble solvents are co-used, but the total proportion of solvents does not exceed 30 parts by weight, relative to 100 parts by weight of binder solution, and the proportion of water-insoluble solvents is at most 20 parts by weight of the amount of solvent employed.

12. Process according to claim 1, characterized in that the components are employed in the following percentages
  a. 20–60% by weight of polybutadiene,
  b. 10–60% by weight of hydrocarbon resin,
  c. 5–40% by weight of unsaturated oil and
  d. 10–20% by weight of maleic anhydride,
the sum of the amounts employed having to add up to 100% by weight.

13. Process according to claim 1, characterised in that as component a.) polybutadiene of an average molecular weight of 900, an iodine number of 360 and whereby the >C=C<double bonds have 10 % 1,4-cis configuration, 45 % 1,4-trans configuration and 45 % 1,2-vinyl configuration, is employed.

14. Process according to one or more of Claims 1 to 13, characterised in that as component b.) hydrocarbon resins being polymerisates of 25 – 40 % by weight of isoprene, 30 – 40 % by weight of cyclopentadiene, 15 – 30 % by weight of methyl cyclopentadiene and 5 – 30 % of other unsaturated polymerisable hydrocarbons with 5 – 6 carbon atoms are employed.

15. The heat-curable synthetic resin, manufactured by the process according to claim 1.

16. In a process for preparing a heat curable coating composition which can be pigmented, unpigmented and/or filled, the improvement which comprises using as a resin binder therein a water dilutable, synthetic resin which has been manufactured according to claim 1.

17. A process as defined in claim 16 wherein a heat-curable coating composition useful for an electrophoretic coating process is prepared by using as a binder therein a synthetic resin having an acid number between 60 and 140.

18. A process as defined in claim 16 wherein the heat-curable coating composition useful for electrolytic application is prepared to contain a total solids content of between 7 and 20 percent by weight.

19. Process according to claim 16 wherein the heat-curable coating composition is prepared using as a binder therein a synthetic resin having a viscosity between 40 and 152 seconds, as measured by standard test number DIN 53,211, measured 1:1 in ethylene glycol monobutyl ether at 20°C.

20. Process according to claim 16 wherein the heat-curable coating composition synthetic resin binder includes therein an additional binder selected from the group consisting of hydrophilic, heat-curable aminoplasts, phenolresols, etherified phenol-resols, and mixtures thereof.

* * * * *

UNITED STATES PATENT OFFICE
CERTIFICATE OF CORRECTION

Patent No. 3,937,677      Dated February 10, 1976

Inventor(s) Bernhard Broecker, et al.

It is certified that error appears in the above-identified patent and that said Letters Patent are hereby corrected as shown below:

Col. 3, line 55 (page 8, line 3):
    "vey"      should read      -- very --.

Col. 7, line 66 (page 16, line 9):
    "1,000 - 1,5000"      should read      -- 1,000 - 5,00 --.

Col. 8, line 42 (page 17, line 20):
    -- according -- should appear after "manufactured".

Col. 8, line 51 (page 17, line 29):
    "esterified"      should read      -- etherified --.

Col. 8, line 54 (page 18, line 2):
    "Thses"      should read      -- These --.

Cols. 9-10, Table, 6th column for Example 7 (page 19 - Table):
    "1,00"      should read      -- 1,000 --.

Col. 11, line 25 (Claim 6);(page 24, line 5):
    "5 - '% by weight"      should read -- 5 - 40% by weight --.

Signed and Sealed this

Sixth Day of July 1976

[SEAL]

Attest:

RUTH C. MASON      C. MARSHALL DANN
*Attesting Officer*      *Commissioner of Patents and Trademarks*